(12) United States Patent
Shah et al.

(10) Patent No.: US 9,880,935 B2
(45) Date of Patent: Jan. 30, 2018

(54) EFFICIENT DATA TRANSFER BETWEEN A PROCESSOR CORE AND AN ACCELERATOR

(71) Applicant: Intel Corporation, Santa Clara, CA (US)

(72) Inventors: Pinkesh Shah, Chandler, AZ (US); Herbert Hum, Portland, OR (US); Lingdan Zeng, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/222,792

(22) Filed: Mar. 24, 2014

(65) Prior Publication Data

US 2015/0269074 A1   Sep. 24, 2015

(51) Int. Cl.
*G06F 12/08* (2016.01)
*G06F 12/12* (2016.01)
*G06F 13/28* (2006.01)
*G06F 12/084* (2016.01)
*G06F 12/122* (2016.01)

(52) U.S. Cl.
CPC .......... *G06F 12/084* (2013.01); *G06F 12/122* (2013.01); *G06F 13/28* (2013.01); *G06F 2212/601* (2013.01); *G06F 2212/6042* (2013.01)

(58) Field of Classification Search
CPC .. G06F 12/0875; G06F 12/084; G06F 12/122; G06F 13/28; G06F 2212/601; G06F 2212/6042
See application file for complete search history.

(56) References Cited

U.S. PATENT DOCUMENTS

| | | | |
|---|---|---|---|
| 2004/0168029 A1* | 8/2004 | Civlin | G06F 12/126 711/133 |
| 2012/0204005 A1* | 8/2012 | Dockser | G06F 9/3814 712/205 |
| 2014/0304491 A1* | 10/2014 | Kasahara | G06F 13/28 712/42 |
| 2015/0095580 A1* | 4/2015 | Liu | G06F 12/084 711/130 |
| 2015/0248311 A1* | 9/2015 | Bradbury | G06F 9/542 711/147 |

* cited by examiner

*Primary Examiner* — Ann J Lo
*Assistant Examiner* — Masud Khan
(74) *Attorney, Agent, or Firm* — Lowenstein Sandler LLP

(57) ABSTRACT

A processor writes input data to a cache line of a shared cache, wherein the input data is ready to be operated on by an accelerator. It then notifies an accelerator that the input data is ready to be processed. The processor then determines that output data of the accelerator is ready to be consumed, the output data being located at the cache line or an additional cache line of the shared cache, wherein the cache line or the additional cache line comprises a set first flag that indicates the cache line or the additional cache line was modified by the accelerator and that prevents the output data from being removed from the cache line or the additional cache line until the output data is read by the processor. The processor reads and processes the output data from the cache line or the additional cache.

20 Claims, 11 Drawing Sheets

EFFICIENT DATA TRANSFER BETWEEN A PROCESSOR CORE AND AN ACCELERATOR

TECHNICAL FIELD

Embodiments described herein generally relate to offloading operations to an accelerator (e.g., to a hardware accelerator) and, more specifically, relate to optimizations to maximize efficiency of communications with the accelerator.

BACKGROUND

General purpose processing devices are able to perform most any type of operation. However, there are many operations for which it is inefficient to have the operation performed by the processing device. Accordingly, such operations may be offloaded by the general purpose processing device to a hardware accelerator, which is a type of special purpose processing device that is configured to perform one or more operations quickly and efficiently. By offloading particular operations to one or more hardware accelerators, energy can be conserved and processing time can be improved.

Conventional solutions for offloading data from a general purpose processing device to a hardware accelerator have certain inefficiencies relating to notifications, data exchange, and data sharing between the general purpose processing device and the hardware accelerator. For example, some cache replacement policies may cause cache lines read by an accelerator to be marked as most-recently used, even though the data will not be used further. Numerous other inefficiencies also exist.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
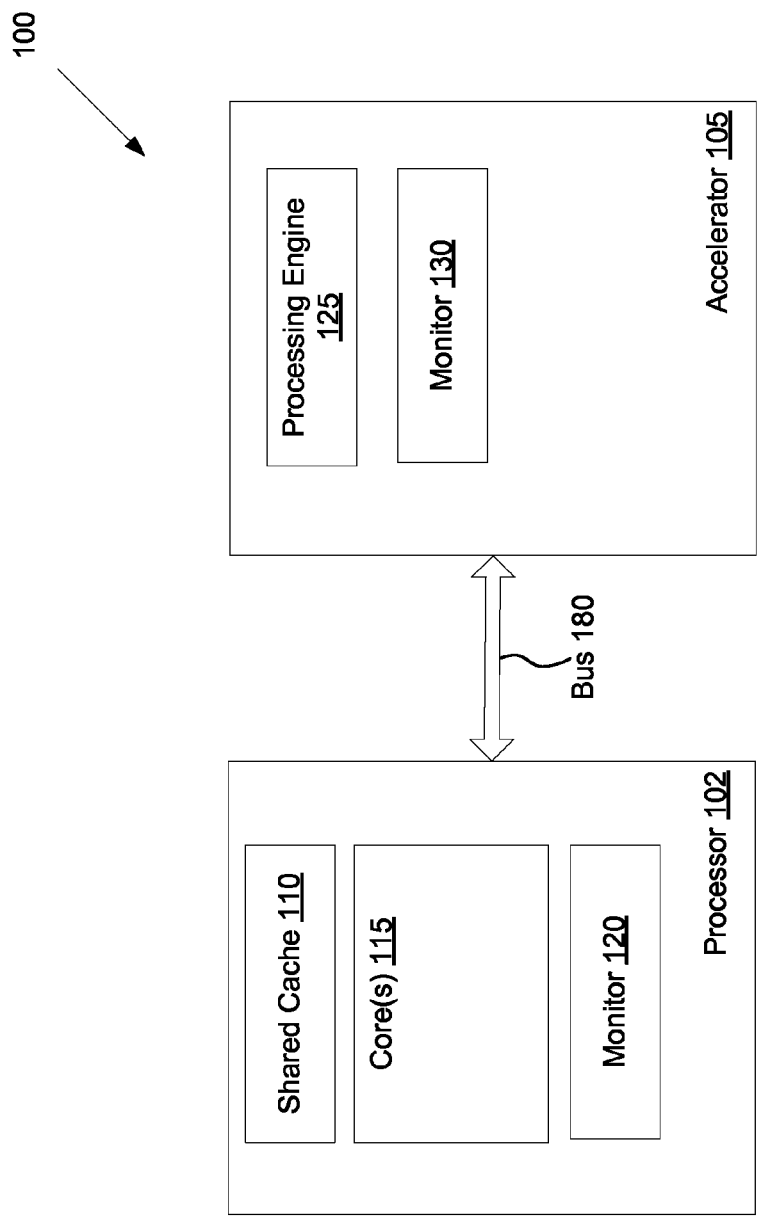
FIG. 1 is a block diagram of a processor coupled to an accelerator, in accordance with one embodiment of the disclosure.

Integrated circuits such a microprocessors and systems on a chip (SoCs) may include both general purpose processing devices and special purpose processing devices, e.g., both processors and accelerators. In some instances, these processing devices are part of a single integrated circuit (IC), while in other instances these processing devices are distinct ICs. A shared memory or shared cache may be used to exchange data between a processor and an accelerator.

In one embodiment, the shared cache (or shared memory) includes a least recently used (LRU) flag and an accelerator flag. After the accelerator (e.g., a hardware accelerator) reads the data from the shared cache, the data is not likely to be used by any other processes. Accordingly, the accelerator may set the LRU flag for the read data, thus ensuring that the cache lines storing the data will be reused for other purposes without delay (e.g., so that the data in these cache lines will be the first to be replaced). In some instances, the accelerator may reuse the same cache line that was originally used to store the input data (e.g., may later write output data to that same cache line). In such an instance, when the accelerator reads the input data it would not mark the cache line as LRU.

After the accelerator performs operations on the data, it writes output data to the shared cache, and marks the output data with the accelerator flag. The accelerator flag indicates that the output data was written by the accelerator, and prevents the output data from being overwritten until it is read by a core of the processor. Additionally, in one embodiment the accelerator flag indicates that the output data is not to be written to memory. Once the core of the processor reads the data, it may clear the accelerator flag and set the LRU flag for the output data, thus ensuring that the cache lines storing this data will be reused without delay. The use of the LRU flag and the accelerator flag in the shared cache enables data to be preserved when important to do so, and ensures that the cache lines storing the data will be quickly reused when the data is no longer needed, improving efficiency of the data sharing. Thus, embodiments prevent data from staying in the cache for long after the accelerator or processor core consumes the data.

In one embodiment, one or more monitors are used to efficiently exchange notifications between the accelerator and the processor. A core that is to offload processing to an accelerator performs an operation on a monitored register or cache line. A monitor associated with the accelerator (which may or may not be a logic of the accelerator) may monitor the register or cache line for a particular event (e.g., for a read invalidate own operation). Once the event is detected, the monitor may wake a processing engine of the accelerator and/or notify the accelerator of data to be operated on. Similarly, the accelerator may write a result of the offloaded operations to one or more cache lines. The accelerator may additionally perform an operation on a monitored register or cache line (e.g., a read invalidate own operation). A monitor associated with the processor may monitor the register or cache line. Upon detecting the read invalidate own operation on the register or cache line, the monitor may wake a process running on a core of the processor and/or notify the core (and/or process) of the output data. The monitors reduce overhead associated with signaling between a processor and, for example, a hardware accelerator to which the processor offloads certain processing tasks.

FIG. 1 is a block diagram of a processor 102 coupled to an accelerator 105 via a bus 180, in accordance with one embodiment of the disclosure. In one embodiment, the processor 102 and the accelerator 105 are two discreet integrated circuits (ICs). In another embodiment, the processor 102 and accelerator 105 are both components of a single IC.

The processor 102 may be an integrated circuit having a general purpose processing capability (e.g., a general purpose processing device) or having a special purpose processing capability (e.g., a special purpose processing device). Examples of integrated circuits include a processing device (e.g., a complex instruction set computing (CISC) microprocessor, reduced instruction set computer (RISC) microprocessor, very long instruction word (VLIW) microprocessor, digital signal processor (DPS), processor implementing other instruction sets, or processors implementing a combination of instruction sets), a system on a chip (SoC), an application specific integrated circuit (ASIC), or the like.

The accelerator 105 may be an integrated circuit that is configured to efficiently perform one or more particular operations. In one embodiment, the accelerator 105 is a hardware accelerator having a physical configuration for performing the operations. In another embodiment, the accelerator 105 may be implemented using a programmable logic device (PLD) such as a field programmable gate array (FPGA) that has been loaded with a configuration for performing the one or more operations. Accelerators can typically perform one or a few operations much more efficiently than processors. Examples of tasks often performed by accelerators include key exchange, encryption, decryption, authentication, data compression and decompression, speech processing, image processing, video processing, and so on.

The processor 102 may include a shared cache 110, one or more cores 115, a monitor 120, and numerous other components that are not illustrated to avoid obscuring embodiments of the invention. Similarly, the accelerator 105 may include a processing engine 125, a monitor 130 and other components. Alternatively, monitor 130 may be a component of processor 102.

When a core 115 is ready to offload processing of data to the accelerator 105, the core 115 may write the data to the shared cache 110, and may perform an operation (e.g., a read invalidate own (RdInvOwn) operation) on a specific register of the core 115 or a specific register of the accelerator. Alternatively, the core 115 may perform the operation on one or more specific cache lines of the shared cache 110.

Monitor 120 and monitor 130 are each logics (e.g., hardware logic circuits) that are capable of performing a limited range of operations. The monitors 120, 130 consume minimal power, and provide efficient signaling between the processor 102 and accelerator 105. Monitor 120 and monitor 130 are each configured to monitor one or a few registers or cache lines. The monitors 120, 130 may be configured to monitor these cache lines or registers at initialization. The monitors 120, 130 may be configured to monitor the same registers or cache lines and/or different registers or cache lines.

Monitor 130 may monitor specified registers or cache lines for particular activity, which in one embodiment is the read invalidate own (RdInvOwn) operation on one of the registers or cache lines. The RdInvOwn operation is a read operation that acquires exclusive ownership (e.g., of the register or cache line). Responsive to detecting a RdInvOwn operation on a monitored register or cache line, the monitor 130 may wake or power up processing engine 125 if processing engine 125 was suspended or turned off. Once the processing engine 125 is powered up, monitor 130 may notify processing engine 125 that there is input data in one or more cache lines of the shared cache 110 to be processed. Alternatively, the input data may be stored in a memory (e.g., in random access memory (RAM)). In one embodiment, monitor 130 notifies processing engine 125 that instruction have been written to a queue in the shared cache 110 or memory. The instructions written to the queue may contain a pointer (e.g., one or more addresses) to cache lines and/or memory locations at which input data has been written. The location of the queue (e.g., the cache lines or memory addresses containing the queue) may be preconfigured in one embodiment, or may be determined or set at initialization. For example, instructions may be written to a queue that is specified to be at particular cache lines of the shared cache 110 or specific addresses of memory.

Processing engine 125 reads the queue, and identifies the addresses at which the input data is located. The addresses may be virtual addresses in a virtual address space used by the core 115. Processing engine 125 then reads the input data using the virtual addresses. In one embodiment, when processing engine 125 reads the input data from cache lines, processing engine 125 sets a flag in those cache lines indicting them as least recently used (LRU). Processing engine 125 may also change a state of the cache lines from modified to exclusive. This ensures that the modified cache lines will not be sent to main memory on eviction after the accelerator has read these cache lines. This may cause these cache lines to be reused without delay. Without the setting of the LRU flag, the input data would likely remain in the shared cache for an extended period since it was recently read. In an alternative embodiment, the processor may set the LRU flag of the cache lines and/or set the state of the cache lines as exclusive responsive to the processing engine 125 reading the cache lines.

Processing engine 125 then processes the input data to produce output data and writes the output data to one or more additional cache lines of the shared cache 110 (or to memory). In one embodiment, the output data is written to the cache lines or memory using the virtual address space of the core 115. In one embodiment, processing engine sets an accelerator flag in the cache lines to which the output data is written. Alternatively, the processor may set the accelerator flag. The accelerator flag may prevent the output data from being deleted or relocated to memory until the core 115 reads the output data from the cache lines and removes the accelerator flag. Accordingly, the output data may not be removed from the shared cache 110 while the accelerator flag is set. Processing engine 125 may additionally perform a RdInvOwn operation on one or more registers or cache lines monitored by monitor 120.

Monitor 120 may monitor for particular operations on specific registers or cache lines, such as RdInvOwn operations. Responsive to detecting such a RdInvOwn operation, the monitor 120 may notify a core 115 that the output data is ready. If a process running on the core that initially caused the accelerator 105 to operate on the input data is suspended, monitor 120 may additionally wake that process.

The core 115 may then read the output data from the cache lines (or memory addresses) to which the output data was written (e.g., into an L2 cache of the core 115). In one embodiment, the core 115 accesses an output queue, which may include a pointer to the output data (e.g., virtual addresses of cache lines or memory locations storing the output data). In one embodiment, after reading the output data from cache lines, the core 115 removes an accelerator flag from those cache lines. Additionally, the core 115 may set the LRU flag on those read cache lines. This may cause the cache lines to be reused without delay.

Figure 2:
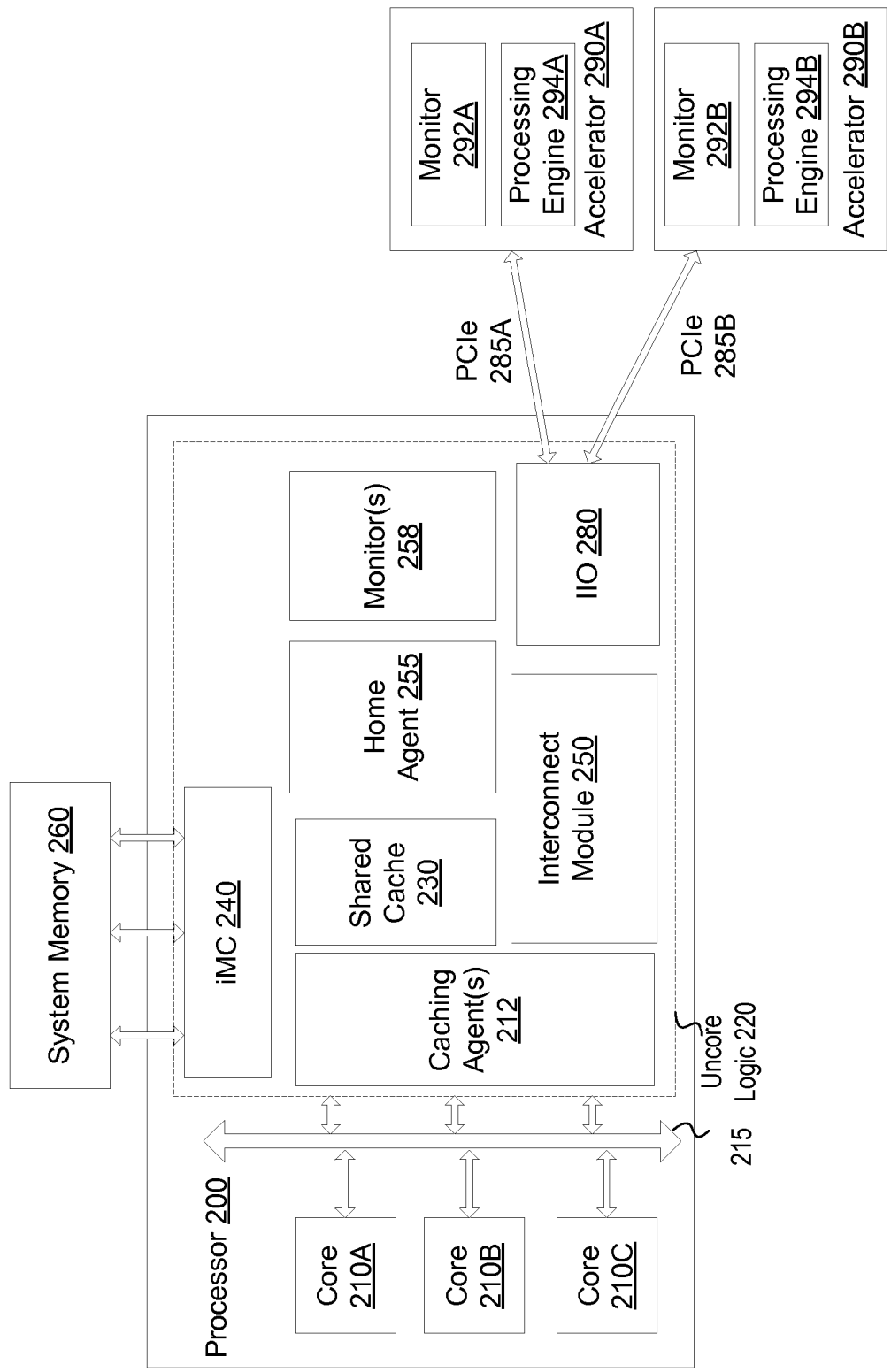
FIG. 2 is a block diagram of an integrated circuit system architecture, according to one embodiment of the disclosure.

Referring now to FIG. 2, shown is a high level block diagram of a processor 200 in accordance with an embodiment of the present invention. In one embodiment, processor 200 corresponds to processor 102 of FIG. 1. As shown in FIG. 2, processor 200 may be a multicore processor including multiple cores 210A-210C. These cores may be physical processors, and may include various components such as front end units, execution units and back end units.

The various cores may be coupled via an interconnect 215 to an uncore logic 220. The uncore logic 220 is logic of the processor 200 outside of the cores that includes various components. Uncore logic 220 may include a shared cache 230 which may be a last level cache (LLC). In addition, the uncore logic 220 may include an integrated memory controller (iMC) 240, a home agent (HA) 255, one or more caching agents (referred to as Cbos) 212, an integrated input/output cluster (IIO) 280, and an interconnect module 250 that connects the processor 200 to other processors (not shown) via an interconnection.

One or more caching agents 212 (Cbos) manage the interface 215 between the cores 210A-C and the shared cache 230. Thus, caching agents 212 write data to and read data from cache lines in shared cache 230. The caching agents 212 are responsible for managing data delivery between the cores 210A-210C and the shared cache 230. The caching agents 212 are also responsible for maintaining cache coherency between the cores 210A-210C within a single socket (e.g., within processor 200). This may include generating snoops and collecting snoop responses from cores 210A-210C in accordance with a cache coherence protocol such as MESI, MOSI, MOESI, or MESIF. The uncore logic 220 may include multiple caching agents 212 (e.g., 8 caching agents in one embodiment), each assigned to manage a distinct subset of the shared cache.

The caching agents 212 may act as a proxy between the IIO 280 and the interconnect module 250, which in one embodiment is a QuickPath Interconnect (QPI). Thus, the caching agents 212 perform a gate keeper function for all messages that originate from the IIO 280 and that are to be transmitted to remote sockets (e.g., other processors or accelerators 290A, 290B). Similarly, the caching agents 212 may act as a proxy for messages originating in the remote sockets or accelerators and associated with a cache line that is owned by an I/O device that IIO 280 communicates with. The caching agents 212 (and/or home agents) may have an ability to identify the source of read requests (e.g., RdInvOwn requests). The caching agents 212 may for example identify a read request as originating from the IIO 280, where read requests from an accelerator 290A, 290B originate, and thus alter cache line bits accordingly.

Home agent 255 controls coherent access to, and otherwise manages, a subset of a system memory 260. Home agents are responsible for ensuring that a most recent version of data is returned to a requestor either from memory or a cache. The home agents are also responsible for invalidating cache lines associated with caching agents responsive to requests for exclusive access to the data. For example, home agent 255 may perform various processing for requests directed to a portion of system memory 260 coupled to processors 200A-200C. This region of system memory (e.g., a range of memory addresses and/or cache lines) may, for example, correspond to one or more dual in-line memory modules (DIMMs). More specifically, home agent 255 may receive incoming requests that are directed to this region of memory and, via logic present in the home agent 255, resolve conflicts and maintain ordering of transactions among other operations. Accordingly, home agent 255 may include logic to receive requests from various components or agents (e.g., caching agents 212 from any processors) and route these requests as appropriate to the corresponding region of memory via integrated memory controller (iMC) 240 (or through an external memory controller).

Integrated memory controller 240 is the interface between system memory (e.g., DRAM) 260 and the home agent 255. Accordingly, integrated memory controller 240 translates read and write commands into specific memory commands and schedules them with respect to memory timing.

Integrated input/output cluster (IIO) 280 is an I/O controller that is included in processor 200. In alternative embodiments an external input/output controller (e.g., an I/O controller hub, which may be a component of a southbridge integrated circuit) may be used rather than IIO 280. IIO 280 (or other I/O controller) connects to and controls I/O devices. For example, IIO 280 may connect to I/O devices via PCI, PCI express (PCIe), PCI extended (PCI-X), or other buses 285A-285B. The I/O devices may be, for example, network adapters, graphics cards, audio cards, SCSI controllers, cluster interconnects, hard drive controllers, disk drives, accelerators, and so forth.

The IIO 280 may receive I/O write requests (e.g., for PCIe writes) from I/O devices connected to the IIO. In one embodiment, PCIe 285A connects IIO 280 to accelerator 290A, and PCIe 285B connects IIO 280 to accelerator 290B. Accelerator 290A may include a monitor 292A and a processing engine 294A. Accelerator 290B may similarly include a monitor 292B and a processing engine 294B. Alternatively, monitors 292A and/or 292B may be components of uncore logic 220. Each accelerator 290A, 290B may also include its own registers, a control logic responsible for data exchange, an oncore fabric that ties components of the accelerators 292A, 292B together, and so on (not shown).

Each of the accelerators 290A, 290B may read input data from cache lines of the shared cache 230 or from system memory 260, and write output data to cache lines of the shared cache 230 or to system memory 260. The monitors 292A, 292B each monitor registers (e.g., of one or more of the cores 210A-210C and/or a specific accelerator 290A, 290B) or specific cache lines for RdInvOwn operations. Responsive to detecting such a RdInvOwn operation on a monitored register or cache line, monitor 292A may notify processing engine 294A of work to perform. Similarly, monitor 292B may notify processing engine 294B of work to perform. After reading data from a cache line in shared cache 230 or a location of system memory 260, processing engines 294A, 294B may set an LRU flag in those cache lines or memory locations. Alternatively, a caching agent 212 or home agent 255 may set the LRU flag. A processing engine 294A, 294B then writes output data to cache lines of shared cache 230 or to addresses of system memory 260. In one embodiment, processing engines 294A, 294B set an accelerator flag in the cache lines or memory locations to which the output data is written. Alternatively, a caching agent 212 or home agent 255 may set the accelerator flag.

The uncore logic 220 may additionally include one or more monitors 258. In one embodiment, uncore logic 220 includes a separate monitor 258 for each of the cores 210A-210C. Uncore logic 220 may also include a separate monitor 258 for each accelerator 290A, 290B (e.g., if the accelerators lack monitors). Alternatively, a single monitor or a few monitors may perform monitoring and signaling operations for some or all of the cores 210A-210C and/or for accelerators 290A, 290B. A monitor 258 may monitor specified registers (e.g., of the accelerators 290A, 290B and/or cores 210A-210C) and/or cache lines for RdInvOwn operations. Responsive to detecting such an operation on a monitored register or cache line, monitor 258 notifies a particular core such as core 210A that output data generated by an accelerator 290A is ready. The notified core 210A may be the core that is associated with the monitor 258, or may be a core that requested work to be performed by the accelerator 290A, or both.

After receiving a notification of ready output data in the shared cache 230 or system memory 260, a core (e.g., core 210A) determines cache lines or memory addresses storing the output data and reads the output data from the cache lines or memory addresses. Responsive to reading the output data from the cache lines or memory addresses, the core may clear an accelerator flag and/or may set an LRU flag for those cache lines or memory addresses. Alternatively, the caching agent 212 or home agent 255 may set the LRU flag and/or clear the accelerator flag.

Figure 3A:
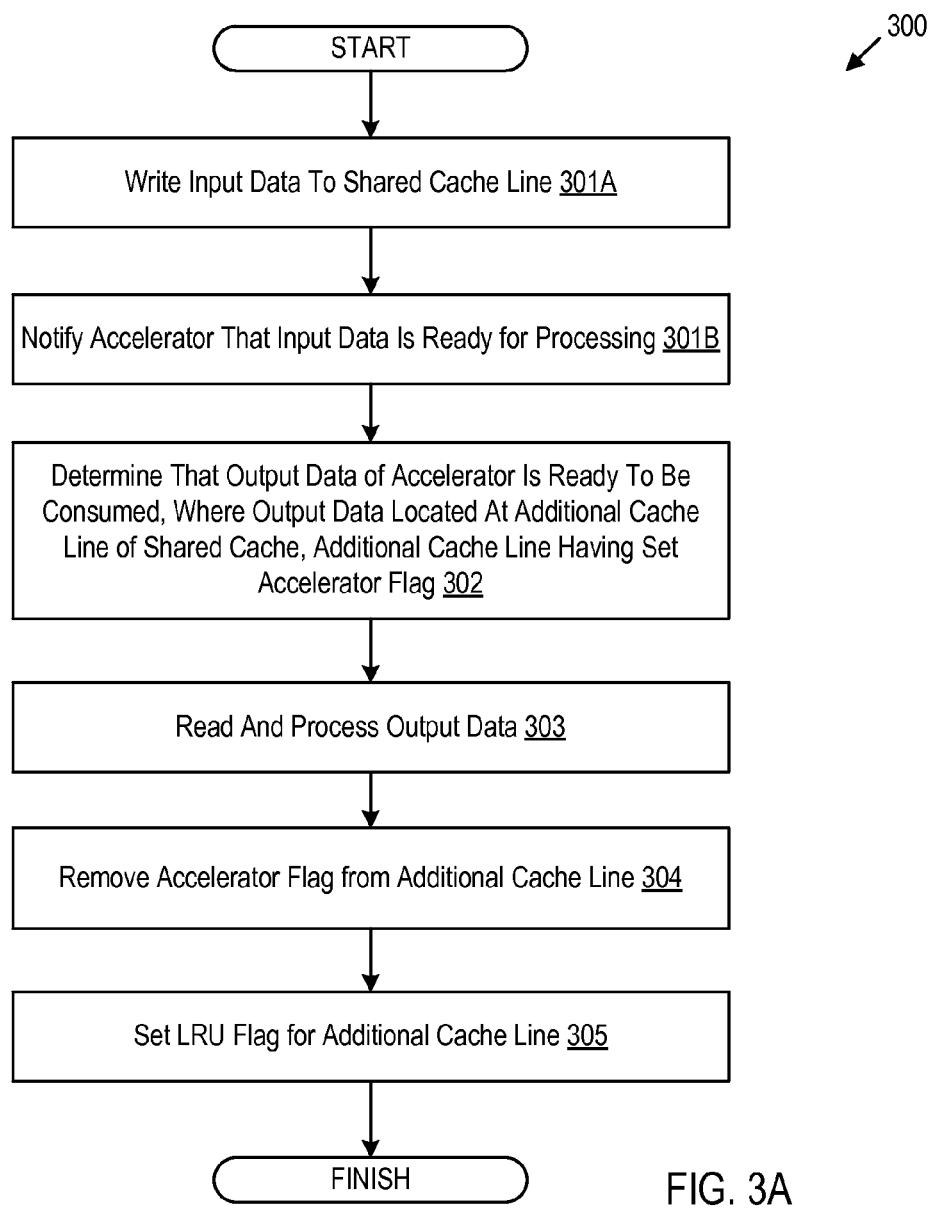
FIG. 3A is a flow diagram illustrating one embodiment for a method of efficiently sharing data in a shared cache between a processor and an accelerator.

FIG. 3A is a flow diagram illustrating one embodiment for a method 300 of efficiently sharing data in a shared cache between a processor and an accelerator. Method 300 may be performed by processing logic that may include hardware (e.g., circuitry, dedicated logic, programmable logic, microcode, etc.), software (such as instructions running on a processing device, a general purpose computer system, or a dedicated machine), firmware, or a combination thereof. In one embodiment, method 300 may be performed by processor 102 of FIG. 1. Some operations of method 300 may be performed by one or more cores 115 of processor 102.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

At block 301A of method 300, processing logic writes input data to a cache line. At block 301B, processing logic notifies an accelerator that the input data is ready for processing. In one embodiment, the accelerator is notified by performing a RdInvOwn operation on a register or cache line that is monitored by a monitor associated with the accelerator. In one embodiment, to reduce future overhead in notifying the processor core from the accelerator, the monitor is made accessible at a user-level mode in the processor core. By using user-level monitors (e.g., a user-level MONITOR/MWAIT), user-kernel mode transitions in the processor core can be avoided. Alternatively, processing logic may use a memory mapped input/output (I/O) uncacheable write for the notification to the accelerator. However, a memory mapped I/O is an uncacheable write that may consume 100+ nanoseconds, which can be greater than 300 cycles for a 3 GHz core (or greater than 600 instructions considering 2 instructions per cycle).

At block 302, processing logic determines that output data generated by the accelerator is ready to be consumed. In one embodiment, a monitor detects a RdInvOwn operation on a monitored register or cache line. The monitor may then notify a processor core that the output data is ready to be consumed. The output data may be located at one or more cache lines of shared cache, and may have an accelerator flag set to keep the cache line from being cleared. Alternatively, notification from the accelerator to the processor core may be based on PCI writes, polling, and/or interrupts in the processor core. The processor core may also periodically check a register in the accelerator or a semaphore in memory to determine if the accelerator is done processing input data.

At block 303, processing logic reads and processes the output data from the cache lines. At block 304, processing logic removes the accelerator flag from one or more additional cache lines. At block 305, processing logic sets an LRU flag for the additional cache lines. The method then ends.

Figure 3B:
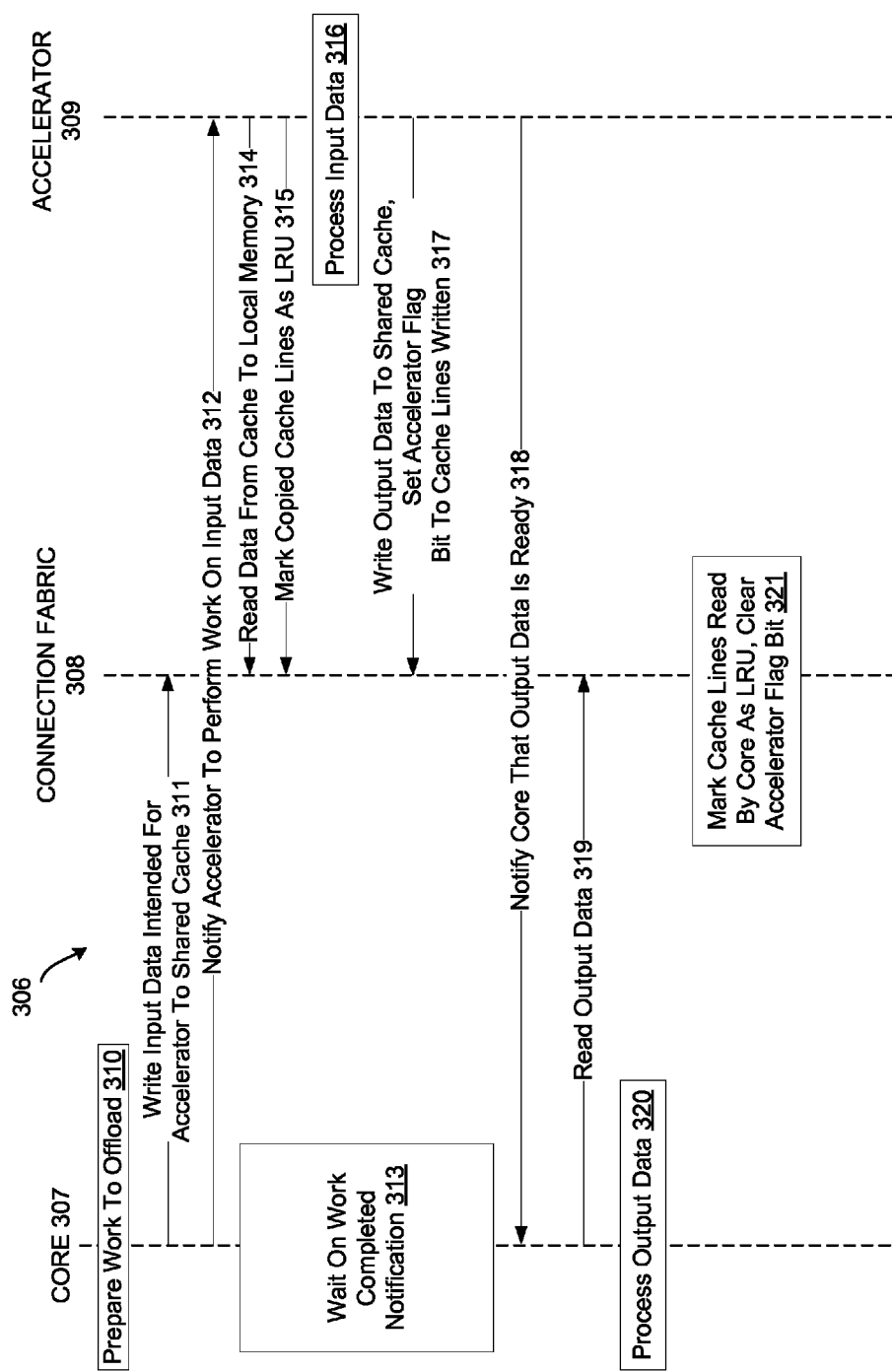
FIG. 3B is a sequence diagram illustrating one embodiment for efficiently sharing data in a shared cache between a processor and an accelerator.

FIG. 3B is a sequence diagram 306 illustrating one embodiment for efficiently sharing data in a shared cache between a processor and an accelerator. The sequence diagram 306 may also apply to sharing data using system memory. The sequence diagram includes a core 307 of a processor, a connection fabric 308 of the processor, and an accelerator 309 coupled to the processor. The connection fabric 308 may be an uncore logic of the processor.

At block 310, the core prepares work to offload to the accelerator 309. Once the work is prepared, in one embodiment at block 311 the core 307 writes input data that will be processed by the accelerator 309 to shared cache of the connection fabric 308. Alternatively, the input data may already be present in the shared cache. At block 312, the core 307 notifies the accelerator 309 to perform work on the input data in the shared cache. This may include notifying the accelerator 309 of a location (e.g., cache lines) in the shared cache of the input data.

At block 314, the accelerator 309 reads the data from cache lines in the shared cache to local memory of the accelerator 309. At block 315, the accelerator 309 marks the cache lines of the shared cache from which the input data was read as being least recently used (LRU). In one embodiment, the accelerator 309 sets an LRU flag for these cache lines. The LRU flag may be one or more bits that, if set, indicate the cache line as being least recently used. The accelerator 309 may also set the state of the cache line from modified to exclusive. Note that in some embodiments the connection fabric may handle the setting of the LRU flag and/or setting of the state from modified to exclusive.

At block 316, the accelerator 309 processes the input data to generate a result that includes output data. At block 317, the accelerator 309 then writes the output data to cache lines of the shared cache. The accelerator 309 additionally marks the cache lines as having been written by an accelerator using an accelerator flag. In one embodiment, the accelerator 309 marks the cache lines by setting one or more bits that, when set, indicate the cache line as having been modified by an accelerator. Alternatively, the connection fabric may handle setting the accelerator flag. At block 318, the accelerator 309 then notifies the core 307 that the output data is ready. This may include notifying the core 307 of the cache lines at which the output data is located.

During the operations of blocks 314-318, the core 307 may wait for a work completed notification from the accelerator (block 313). During this time the core 307 may be idle, and/or may suspend a process waiting on the output data from the accelerator. In some instances, the core 307 may perform other operations (e.g., for other processes) until the notification is received at block 318. At block 320, the core processes (e.g., reads) the output data. Once the core 307 processes (e.g., reads) the output data, the core 307 or the connection fabric 308 may mark the cache lines holding the output data as LRU by setting the LRU flag. Additionally, the core 307 or connection fabric 308 may clear the accelerator flag (e.g., by setting an accelerator flag bit from 1 to 0).

Figure 3C:
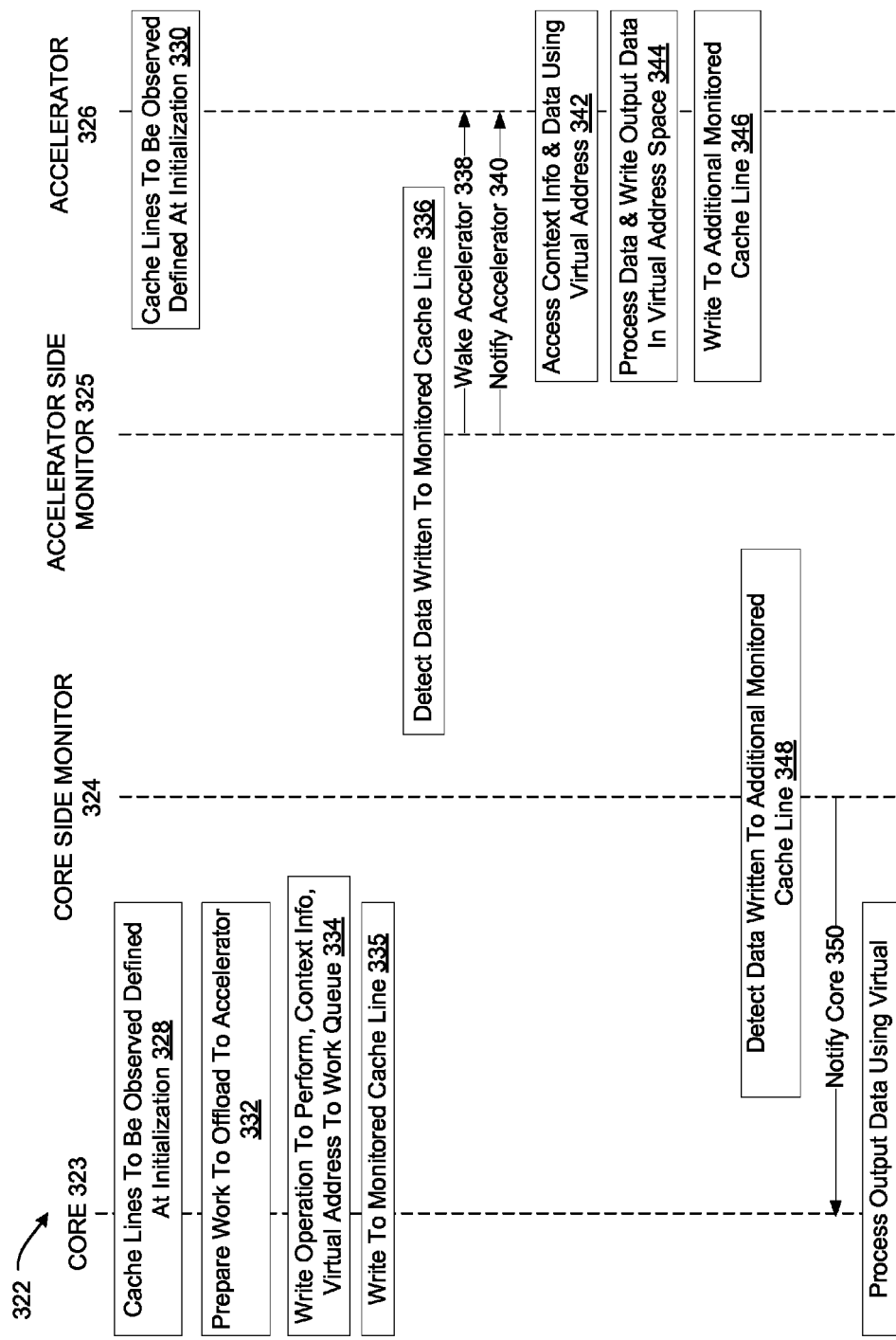
FIG. 3C is a sequence diagram illustrating one embodiment for efficiently communicating between a processor and an accelerator.

FIG. 3C is a sequence diagram 322 illustrating one embodiment for efficiently communicating between a processor core 323 and an accelerator 326. The sequence diagram 322 includes a core 323 of a processor, a core side monitor 324, an accelerator side monitor 325 and an accelerator 326 coupled to the processor. The core side monitor 324 may be a logic of the processor's uncore logic. The accelerator side monitor 325 may be a logic of the accelerator 326 that is separate from a processing engine of the accelerator 326 or may be a component of the processor's uncore logic.

At block 328, the core 323 defines one or more cache lines or registers to be monitored by the core side monitor 324 at initialization. The cache lines may be specific cache lines of a shared cache and/or the registers may be specific registers of the accelerator or core. At block 330, the accelerator defines one or more cache lines or registers to be monitored by the accelerator side monitor 325. The cache lines may be specific cache lines of the shared cache and/or the registers may be specific registers of the core 323 or accelerator.

At block 332, the core prepares work to offload to the accelerator 309. This may include writing data to cache lines of a shared cache or to addresses of a memory. Once the work is prepared, at block 334 the core 323 writes instructions to one or more cache line that are designated as a queue for the accelerator. The instructions may include an indication of an operation to be performed by the accelerator processing engine 326, contextual information and/or a virtual pointer to the input data in the shared cache or memory. Use of the virtual pointer enables the accelerator to access and process the input data from non-contiguous cache lines and/or memory addresses without any address translations or copying of data to enable the accelerator to read the input data. At block 335, the core 323 performs a RdInvOwn operation to a block 325 monitored cache line or register.

At block 336, the accelerator side monitor 325 detects the RdInvOwn operation on the monitored cache line or register. The accelerator side monitor 325 may read a core ID, a thread ID and/or an accelerator ID written to the cache line or register. The core ID may indicate the core that performed the operation, the thread ID may indicate a thread associated with the operation, and the accelerator ID may indicate an accelerator to which work is to be offloaded. At block 338, the accelerator side monitor 325 wakes the accelerator processing engine 326. This operation may be skipped if the accelerator processing engine 326 is already awake. At block 340, the accelerator side monitor 340 notifies the accelerator processing engine 326 that there are instructions in the queue to be processed.

At block 342, the accelerator processing engine 326 accesses the queue. The accelerator processing engine determines the operation to be performed, appropriate context information, and the virtual pointer that were written to the queue. The context information may be information related to the operation to be performed. For example, if the operation is an encryption operation, the context information might include a type of encryption to be performed. The accelerator processing engine uses the virtual pointer to access the context information and the data, and reads the data into the accelerator. At block 344, a processing engine of the accelerator processes the input data and writes output data to the shared cache and/or memory. In one embodiment, the accelerator 326 writes the output data in the virtual address space used by the core 323 (and by a process running on the core). By providing the input data to the accelerator 326 using the virtual address space used by the core 323 and enabling the accelerator 326 to write the output data to the same virtual address space, memory and cache address translations can be mitigated. For example, without use of the virtual address space, the core 323 in some instances would translate the virtual addresses to physical addresses, move data to contiguous physical addresses, and report the location of the physical addresses at which the input data was located to the accelerator 326.

At block 346, the accelerator 326 performs an operation on an additional monitored cache line or register to signal to the core 323 that the output data is ready. At block 348, the core side monitor 324 detects the operation on the monitored cache line or register. In one embodiment, the core side monitor 324 detects that a RdInvOwn operation has been performed on the monitored cache line or register by the accelerator 326. At block 350, the core side monitor notifies the core 323 that the output data is ready. The core side monitor 324 may additionally wake the core if it is powered down. Additionally, if a process or thread that requested the work performed by the accelerator is suspended, core side monitor 324 may cause that process to become active on the core. At block 352, the core then processes (e.g., reads) the output data. This may include accessing the output data using the virtual address to which the output data was written.

Figure 4:
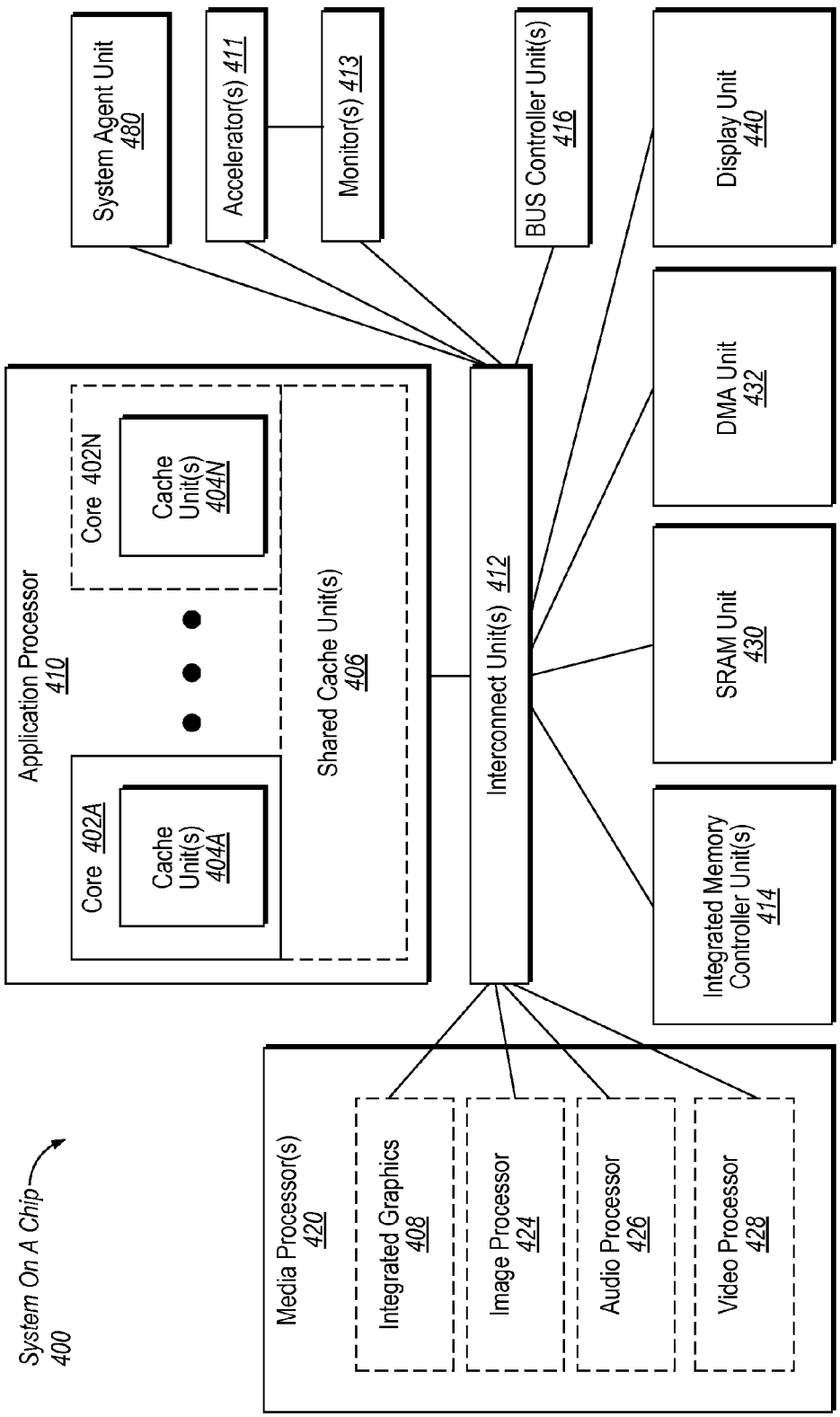
FIG. 4 is a block diagram of a system on chip (SoC), in accordance with an embodiment of the present disclosure.

FIG. 4 is a block diagram of a SoC 400 in accordance with an embodiment of the present disclosure. Dashed lined boxes are optional features on more advanced SoCs. In FIG. 4, an interconnect unit(s) 412 is coupled to: an application processor 410 which includes a set of one or more cores 402A-N and shared cache unit(s) 406; a system agent unit 480; a bus controller unit(s) 416; an integrated memory controller unit(s) 414; a set of one or more media processors 420 which may include integrated graphics logic 408, an image processor 424 for providing still and/or video camera functionality, an audio processor 426 for providing hardware audio acceleration, and a video processor 428 for providing video encode/decode acceleration; an static random access memory (SRAM) unit 430; a direct memory access (DMA) unit 432; and a display unit 440 for coupling to one or more external displays. In one embodiment, one or more accelerators 411 and/or monitors 413 are included in the SoC. The monitors 413 may also be components of the accelerators 411 and/or of the application processor 410.

The memory hierarchy includes one or more levels of cache within the cores, a set or one or more shared cache units 406, and external memory (not shown) coupled to the set of integrated memory controller units 414. The set of shared cache units 406 may include one or more mid-level caches, such as level 2 (L2), level 3 (L3), level 4 (L4), or other levels of cache, a last level cache (LLC), and/or combinations thereof.

In some embodiments, one or more of the cores 402A-N are capable of multi-threading.

The system agent 480 includes those components coordinating and operating cores 402A-N. The system agent unit 480 may include for example a power control unit (PCU) and a display unit. The PCU may be or include logic and components needed for regulating the power state of the cores 402A-N and the integrated graphics logic 408. The display unit is for driving one or more externally connected displays.

The cores 402A-N may be homogenous or heterogeneous in terms of architecture and/or instruction set. For example, some of the cores 402A-N may be in order while others are out-of-order. As another example, two or more of the cores 402A-N may be capable of execution of the same instruction set, while others may be capable of executing only a subset of that instruction set or a different instruction set.

The application processor 410 may be a general-purpose processor, such as a Core™ i3, i5, i7, 2 Duo and Quad, Xeon™, Xeon-Phi™, Itanium™, XScale™ or StrongARM™ processor, which are available from Intel Corporation, of Santa Clara, Calif. Alternatively, the application processor 410 may be from another company, such as ARM Holdings, Ltd, MIPS, etc. The application processor 410 may be a special-purpose processor, such as, for example, a network or communication processor, compression engine, graphics processor, co-processor, embedded processor, or the like. The application processor 410 may be implemented on one or more chips. The application processor 410 may be a part of and/or may be implemented on one or more substrates using any of a number of process technologies, such as, for example, BiCMOS, CMOS, or NMOS.

Figure 5:
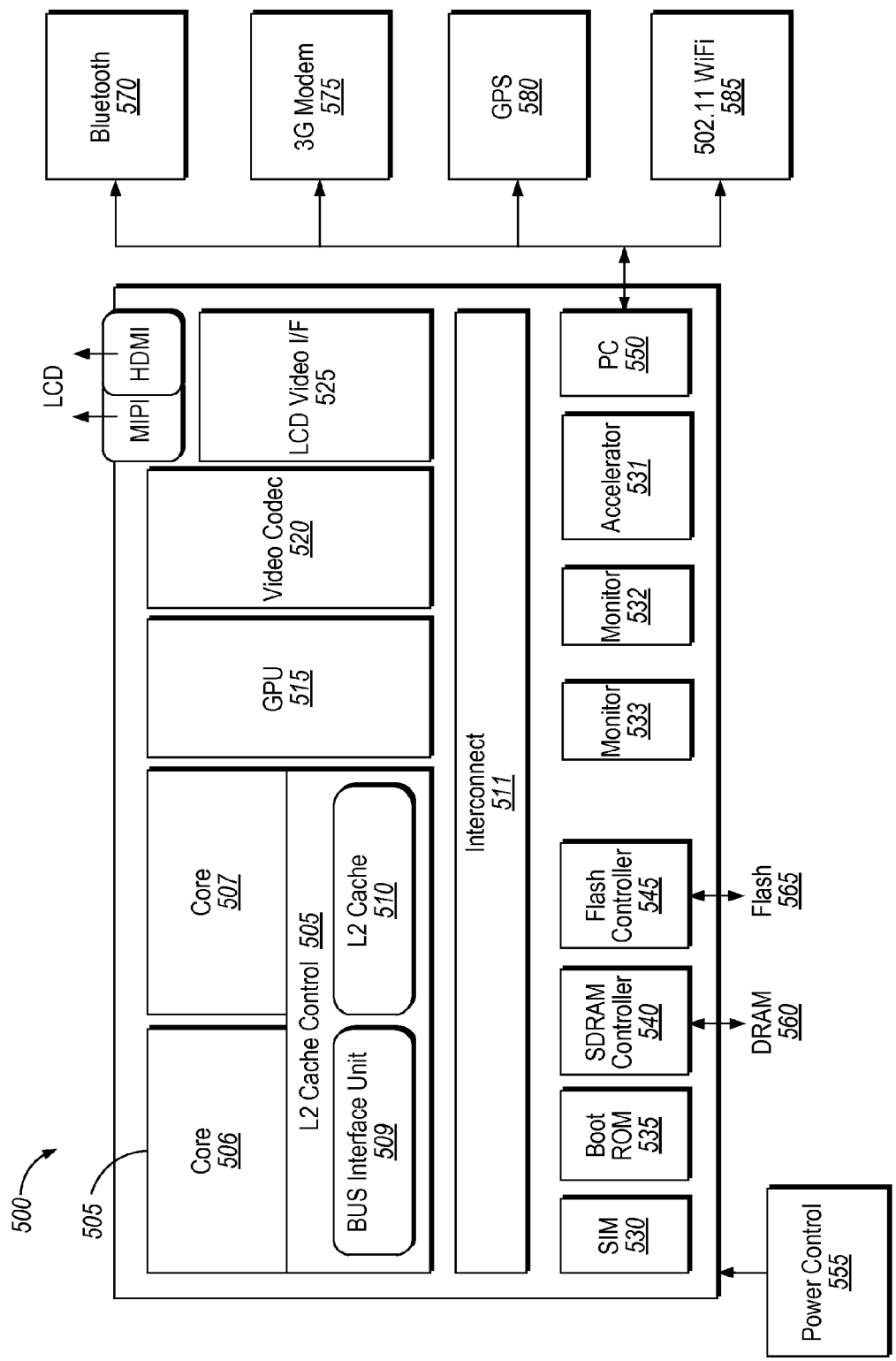
FIG. 5 is a block diagram of an embodiment of a system on-chip (SoC) design, in accordance with another embodiment of the present disclosure.

FIG. 5 is a block diagram of an embodiment of a system on-chip (SOC) design in accordance with embodiments of the present disclosure. As a specific illustrative example, SOC 500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In one embodiment, one or more monitors 532, 533 and/or an accelerator 531 may be included in the SOC 500. In another embodiment, the accelerator 531 may be connected to the SOC 500 (e.g., via a bus).

Here, SOC 500 includes 2 cores—506 and 507. Cores 506 and 507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 506 and 507 are coupled to cache control 505 that is associated with bus interface unit 509 and L2 cache 510 to communicate with other parts of system 500. Interconnect 511 includes an on-chip interconnect, such as an IOSF, AMBA, or other interconnect discussed above, which potentially implements one or more aspects of the described disclosure.

Interconnect 511 provides communication channels to the other components, such as a Subscriber Identity Module (SIM) 530 to interface with a SIM card, a boot ROM 535 to hold boot code for execution by cores 506 and 507 to initialize and boot SOC 500, a SDRAM controller 540 to interface with external memory (e.g. SDRAM 560), a flash controller 545 to interface with non-volatile memory (e.g. Flash 565), a peripheral control 550 (e.g. Serial Peripheral Interface) to interface with peripherals, video codecs 520 and Video interface 525 to display and receive input (e.g. touch enabled input), GPU 515 to perform graphics related computations, etc. Any of these interfaces may incorporate aspects of the disclosure described herein.

In addition, the system 500 illustrates peripherals for communication, such as a Bluetooth module 570, 3G modem 575, GPS 580, and Wi-Fi 585. Note as stated above, a UE includes a radio for communication. As a result, these peripheral communication modules are not all required. However, in a UE, some form a radio for external communication is to be included.

Figure 6:
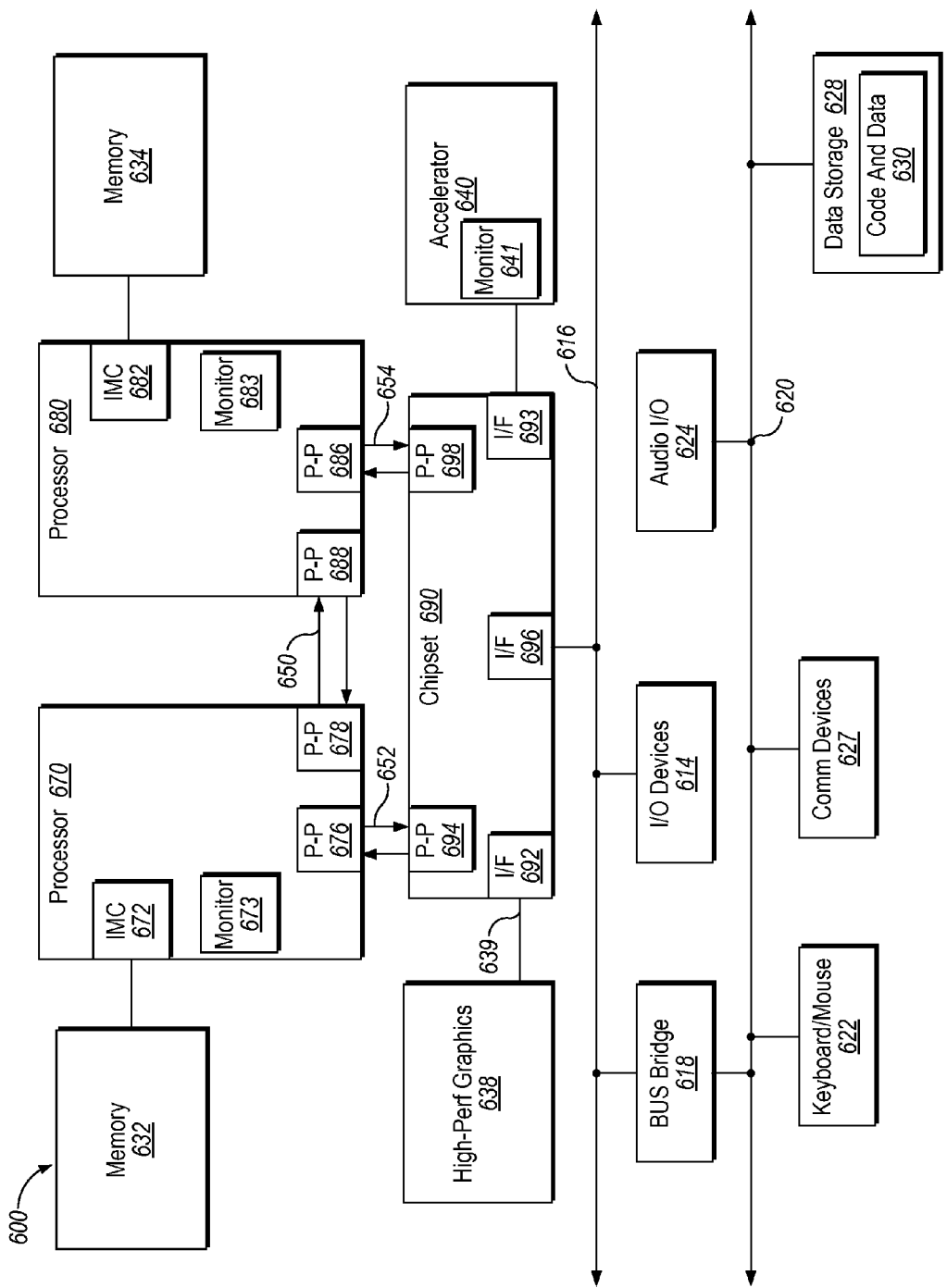
FIG. 6 is a block diagram of a computer system, according to one embodiment of the present disclosure.

FIG. 6 is a block diagram of a multiprocessor system 600 in accordance with an implementation. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores, although potentially many more cores may be present in the processors. A processor core may also be referred to as an execution core. The processors may each may include one or more monitors 673, 683.

While shown with two processors 670, 680, it is to be understood that the scope of the present disclosure is not so limited. In other implementations, one or more additional processors may be present in a given system.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, and 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to an accelerator 640 via an interface 693. The accelerator 640 may include a monitor 641, which may monitor for signals from the processors 670, 680 that there is work for the accelerator 640 to perform.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7A:
FIG. 7A is a block diagram illustrating an in-order pipeline and a register renaming stage, out-of-order issue/execution pipeline implemented by a processor core, in accordance with one embodiment of the present disclosure.
Figure 7B:
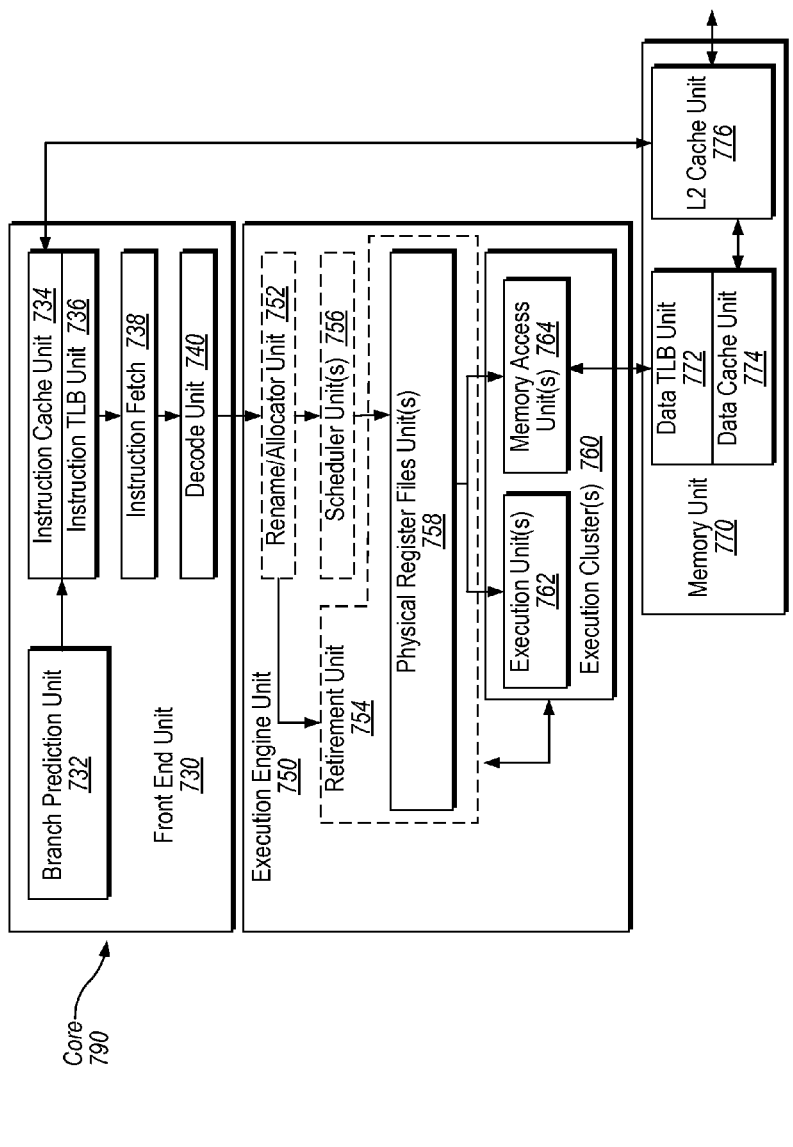
FIG. 7B is a block diagram illustrating an in-order architecture core and a register renaming logic, out-of-order issue/execution logic to be included in a processor according to at least one embodiment of the disclosure.

FIG. 7A is a block diagram illustrating an in-order pipeline and a register renaming stage, out-of-order issue/execution pipeline implemented by core 790 of FIG. 7B (which may be included in a processor). FIG. 7B is a block diagram illustrating an in-order architecture core and a register renaming logic, out-of-order issue/execution logic that may be included in a processor according to at least one embodiment of the invention. The solid lined boxes in FIG. 7A illustrate the in-order pipeline, while the dashed lined boxes illustrates the register renaming, out-of-order issue/execution pipeline. Similarly, the solid lined boxes in FIG. 7A illustrate the in-order architecture logic, while the dashed lined boxes illustrates the register renaming logic and out-of-order issue/execution logic. In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 720, and a commit stage 722.

FIG. 7B is a block diagram illustrating an in-order architecture core and a register renaming logic, out-of-order issue/execution logic that may be included in a processor according to at least one embodiment of the disclosure. In FIG. 7B, arrows denote a coupling between two or more units and the direction of the arrow indicates a direction of data flow between those units. FIG. 7B shows processor core 790 including a front end unit 730 coupled to an execution engine unit 750, and both are coupled to a memory unit 770.

The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to a level 2 (L2) cache unit 776 in the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s)

unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 720; and 8) the retirement unit 754 and the physical register file(s) unit(s) 758 perform the commit stage 722.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
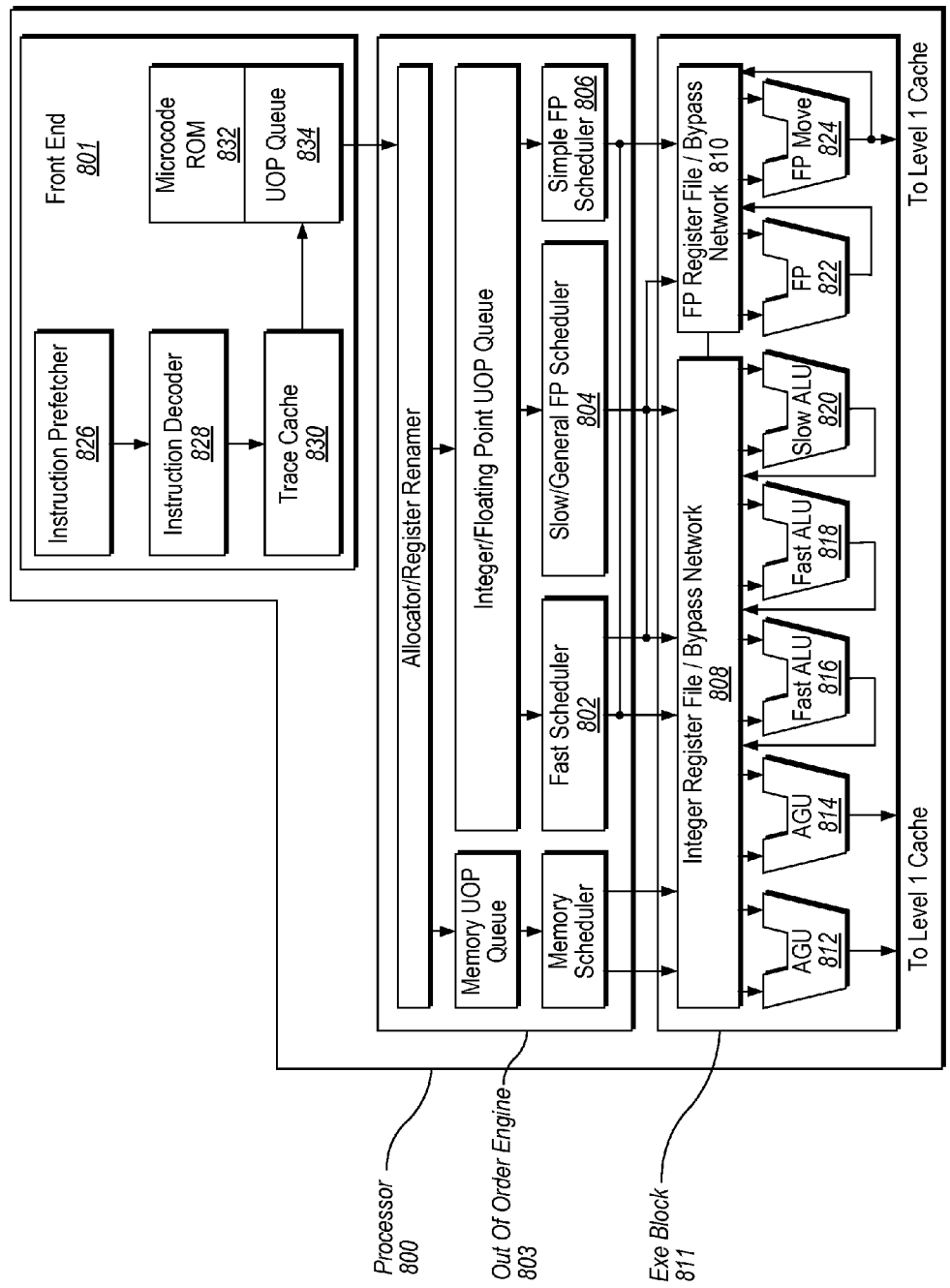
FIG. 8 is a block diagram of the micro-architecture for a processor that includes logic circuits to perform instructions, in accordance with one embodiment of the present invention.

FIG. 8 is a block diagram of the micro-architecture for a processor 800 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 801 is the part of the processor 800 that fetches instructions to be executed and prepares them to be used later in the processor pipeline. The front end 801 may include several units. In one embodiment, the instruction prefetcher 826 fetches instructions from memory and feeds them to an instruction decoder 828 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one embodiment, if more than four micro-ops are needed to complete an instruction, the decoder 828 accesses the microcode ROM 832 to do the instruction. For one embodiment, an instruction can be decoded into a small number of micro ops for processing at the instruction decoder 828. In another embodiment, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one embodiment from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one embodiment can schedule on each half of the main clock cycle while the other schedulers can only schedule once per main processor clock cycle. The schedulers arbitrate for the dispatch ports to schedule uops for execution.

Register files 808, 810, sit between the schedulers 802, 804, 806, and the execution units 812, 814, 816, 818, 820, 822, and 824 in the execution block 811. There is a separate register file 808, 810, for integer and floating point operations, respectively. Each register file 808, 810, of one embodiment also includes a bypass network that can bypass or forward just completed results that have not yet been written into the register file to new dependent uops. The integer register file 808 and the floating point register file 810 are also capable of communicating data with the other. For one embodiment, the integer register file 808 is split into two separate register files, one register file for the low order 32 bits of data and a second register file for the high order 32 bits of data. The floating point register file 810 of one embodiment has 128 bit wide entries because floating point instructions typically have operands from 64 to 128 bits in width.

The execution block 811 contains the execution units 812, 814, 816, 818, 820, 822, 824, where the instructions are actually executed. This section includes the register files 808, 810, that store the integer and floating point data operand values that the micro-instructions need to execute. The processor 800 of one embodiment is comprised of a number of execution units: address generation unit (AGU) 812, AGU 814, fast ALU 816, fast ALU 818, slow ALU 820, floating point ALU 822, floating point move unit 824. For one embodiment, the floating point execution blocks 822, 824, execute floating point, MMX, SIMD, and SSE, or other operations. The floating point ALU 822 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 816, 818. The fast ALUs 816, 818, of one embodiment can execute fast operations with an effective latency of half a clock cycle. For one embodiment, most complex integer operations go to the slow ALU 820 as the slow ALU 820 includes integer execution hardware for long latency type of operations, such as a multiplier, shifts, flag logic, and branch processing. Memory load/store operations are executed by the AGUs 812, 814. For one embodiment, the integer ALUs 816, 818, 820, are described in the context of performing integer operations on 64 bit data operands. In alternative embodiments, the ALUs 816, 818, 820, can be implemented to support a variety of data bits including 16, 32, 128, 256, etc. Similarly, the floating point units 822, 824, can be implemented to support a range of operands having bits of various widths. For one embodiment, the floating point units 822, 824, can operate on 128 bits wide packed data operands in conjunction with SIMD and multimedia instructions.

In one embodiment, the uops schedulers 802, 804, 806, dispatch dependent operations before the parent load has finished executing. As uops are speculatively scheduled and executed in processor 800, the processor 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 9:
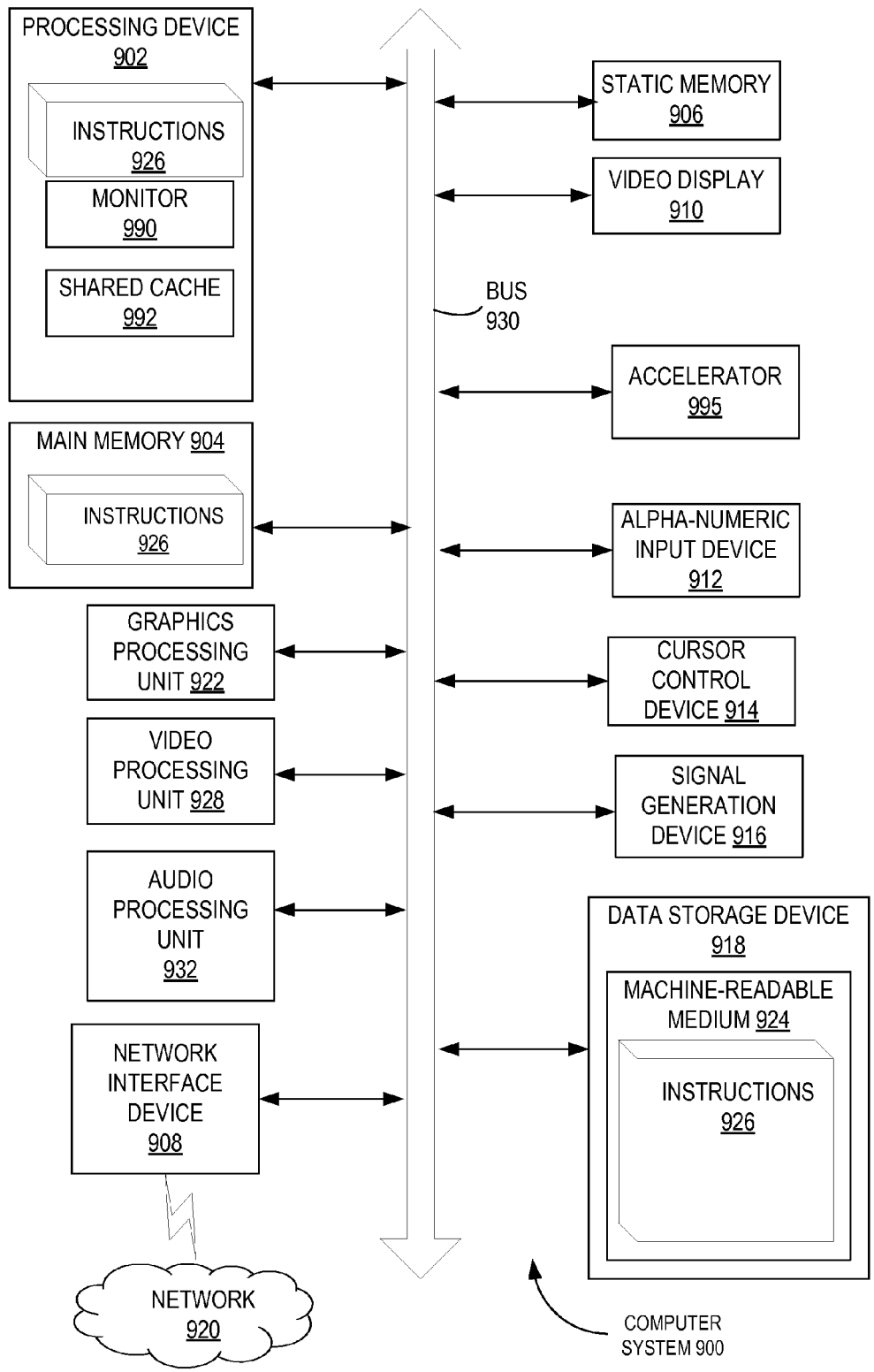
FIG. 9 illustrates a diagrammatic representation of a machine in the example form of a computer system within which a set of instructions, for causing the machine to perform any one or more of the methodologies discussed herein, may be executed.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, one or more monitors 990 (as discussed in conjunction with FIGS. 1-2) may be included in the processing device 902.

The computer system 900 includes a processing device 902, a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), an accelerator 995, and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or more processing cores. The processing device 902 may include a shared cache 992. In one embodiment, the processing device 902 includes a monitor 990, which may correspond to the monitors discussed herein above.

The computer system 900 may further include a network interface device 908 communicably coupled to a network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a signal generation device 916 (e.g., a speaker), or other peripheral devices. Furthermore, computer system 900 may include a graphics processing unit 922, a video processing unit 928, and an audio processing unit 932. In another embodiment, the computer system 900 may include a chipset (not illustrated), which refers to a group of integrated circuits, or chips, that are designed to work with the processing device 902 and controls communications between the processing device 902 and external devices. For example, the chipset may be a set of chips on a motherboard that links the processing device 902 to very high-speed devices, such as main memory 904 and graphic controllers, as well as linking the processing device 902 to lower-speed peripheral buses of peripherals, such as USB, PCI or ISA buses.

The data storage device 918 may include a computer-readable storage medium 924 on which is stored instructions 926 embodying any one or more of the methodologies of functions described herein. The instructions 926 may also reside, completely or at least partially, within the main memory 904 and/or within the processing device 902 during execution thereof by the computer system 900; the main memory 904 and the processing device 902 also constituting computer-readable storage media.

The computer-readable storage medium 924 may also be used to store instructions 926 utilizing, for example control logic 990, which may correspond to logics described with respect to FIG. 1 or 2, and/or a software library containing methods that call the above applications. While the computer-readable storage medium 924 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a method that includes writing input data to a cache line of a shared cache by a processor, wherein the input data is ready to be operated on by an accelerator; determining, by the processor, that output data of the accelerator is ready to be consumed, the output data being located at the cache line or at an additional cache line of the shared cache, wherein the cache line or the additional cache line comprises a set first flag that indicates the cache line or the additional cache line was modified by the accelerator and that prevents the output data from being removed from the cache line or the additional cache line until the output data is read by the processor; reading and processing the output data from the cache line or the additional cache line by the processor; and responsive to processing the output data, removing the first flag from the cache line or the additional cache line.

Example 2 may optionally extend the subject matter of example 1. In example 2, the method further includes setting a second flag in the cache line or the additional cache line by the processor responsive to processing the output data, wherein the second flag marks the cache line or the additional cache line as being least recently used.

Example 3 may optionally extend the subject matter of examples 1-2. In example 3, a second flag is set for the cache line responsive to the accelerator accessing the input data in the cache line, wherein the second flag marks the additional cache line as being least recently used.

Example 4 may optionally extend the subject matter of examples 1-3. In example 4, the shared cache comprises a last level cache of the processor.

Example 5 may optionally extend the subject matter of examples 1-4. In example 5, the method further includes reading the input data in the cache line of the shared cache by the accelerator; marking the input data in the cache line as least recently used by the accelerator; performing operations on the input data by the accelerator to generate the output data; and writing the output data into the cache line or the additional cache line.

Example 6 may optionally extend the subject matter of example 5. In example 6, the method further includes changing a state of the cache line from modified to exclusive by the accelerator.

Example 7 may optionally extend the subject matter of examples 1-6. In example 7, the method further includes performing an operation on a particular cache line that is monitored by a monitor logic associated with the accelerator; detecting, by the monitor logic associated with the accelerator, that a core of the processor has performed the operation on the particular cache line; and notifying the accelerator by the monitor logic that the input data on the cache line is ready to be operated on by the accelerator responsive to the detecting.

Example 8 may optionally extend the subject matter of examples 1-7. In example 8, the operation comprises a read invalidate own operation, and the method further include waking the accelerator by the monitor logic responsive to detecting the read invalidate own operation on the particular cache line.

Example 9 may optionally extend the subject matter of examples 1-8. In example 9, determining that the output data of the accelerator is ready to be consumed comprises detecting, by a monitor logic of the processor, that the accelerator has performed an operation on a particular cache line monitored by the monitor logic; and notifying, by the monitor logic of the processor, a core of the processor that the output data is ready to be consumed responsive to the detecting.

Example 10 may optionally extend the subject matter of example 9. In example 10, the operation comprises a read invalidate own operation on the particular cache line by the accelerator Example 11 is a computing device comprising a processor and an accelerator coupled to the processor, the accelerator configured to accelerate one or more operations for the processor. The processor is to write input data to a cache line of a shared cache, wherein the input data is ready to be operated on by the accelerator; determine that output data of the accelerator is ready to be consumed, the output data being located at the cache line or at an additional cache line of the shared cache, wherein the cache line or the additional cache line comprises a set first flag that indicates the cache line or the additional cache line was modified by the accelerator and that prevents the output data from being removed from the cache line or the additional cache line until the output data is read by the processor; read and process the output data from the cache line or the additional cache line; and remove the first flag from the cache line or the additional cache line responsive to the output data being processed.

Example 12 may optionally extend the subject matter of example 11. In example 12, the accelerator and the processor are both components of a single integrated circuit, and the shared cache comprises a last level cache of the processor.

Example 13 may optionally extend the subject matter of examples 11-12. In example 13, the processor is further to set a second flag in the cache line or the additional cache line to responsive to processing the output data, wherein the second flag marks the cache line or the additional cache line as being least recently used.

Example 14 may optionally extend the subject matter of examples 11-13. In example 14, the accelerator is to read the input data in the cache line of the shared cache; mark the input data in the cache line as least recently used; perform operations on the input data to generate the output data; and write the output data into the cache line or the additional cache line.

Example 15 may optionally extend the subject matter of examples 11-14. In example 15, a core of the processor is further to perform an operation on a particular cache line, and one of the accelerator or the processor comprises a monitor logic configured to monitor the particular cache line; detect that the core of the processor has performed the operation on the particular cache line; and subsequently notify the accelerator that the input data on the cache line is ready to be operated on.

Example 16 may optionally extend the subject matter of examples 11-15. In example 16, the monitor logic is further to wake the accelerator responsive to detecting that the core of the processor has performed the operation on the particular cache line.

Example 17 may optionally extend the subject matter of examples 11-16. In example 17, the processor comprises a core and a monitor logic coupled to the core, and the monitor logic is configured to detect that the accelerator has performed an operation on a particular cache line monitored by the monitor logic; and subsequently notify the core of the processor that the output data is ready to be consumed.

Example 18 is a processor comprising a cache, a core, coupled to the cache, and a connection fabric coupled to the cache and to the core. The core is to write input data to a cache line of the cache, wherein the input data is ready to be operated on by an accelerator; and responsive to receiving a notification that output data of the accelerator is at the cache line or an additional cache line of the cache and ready to be consumed, read and process the output data from the cache line or the additional cache line. The connection fabric is to notify the core that the output data of the accelerator is ready to be consumed, wherein the cache line or the additional cache line comprises a set first flag that indicates the cache line or the additional cache line was modified by the accelerator and that prevents the output data from being removed from the cache line or the additional cache line until the output data is read by the core; and responsive to the output data being processed by the core, remove the first flag from the cache line or the additional cache line and set a second flag in the cache line or the additional cache line, wherein the second flag marks the cache line or the additional cache line as being least recently used.

Example 19 may optionally extend the subject matter of example 18. In example 19, the processor further comprises a monitor logic to detect that the accelerator has performed an operation on a particular cache line monitored by the monitor logic; and notify the core of the processor that the output data is ready to be consumed.

Example 20 may optionally extend the subject matter of examples 18-19. In example 20, the operation comprises a read invalidate own operation on the cache line by the accelerator.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "writing," "detecting," "determining," "reading," "using," "signaling," "notifying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
    writing input data to a first cache line of a cache shared by a processor and an accelerator, wherein the input data is ready to be operated on by the accelerator;
    writing instructions to one or more cache lines, the one or more cache lines designated as a queue for the accelerator, wherein the instructions indicate a first operation to be performed by the accelerator and a virtual pointer to the input data in the cache;
    determining, by the processor, that output data of the accelerator is ready to be consumed, the output data being located at the first cache line or at an additional cache line of the cache, wherein the first cache line or the additional cache line comprises a set first flag that indicates the first cache line or the additional cache line was modified by the accelerator and that prevents the output data from being removed from the first cache line or the additional cache line until the output data is read by the processor;
    reading and processing the output data from the first cache line or the additional cache line by the processor; and
    responsive to processing the output data:
        removing the first flag from the first cache line or the additional cache line; and
        setting a second flag in the first cache line or the additional cache line, wherein the second flag marks the first cache line or the additional cache line as being least recently used.

2. The method of claim 1, further comprising:
    setting the second flag in the first cache line responsive to the accelerator accessing the input data in the first cache line.

3. The method of claim 1, wherein the cache comprises a last level cache of the processor.

4. The method of claim 1, further comprising:
    reading the input data in the first cache line of the cache by the accelerator;

marking the input data in the first cache line as least recently used by the accelerator;

performing a second operation on the input data by the accelerator to generate the output data; and writing the output data into the first cache line or the additional cache line.

5. The method of claim 4, further comprising:

changing a state of the first cache line from modified to exclusive by the accelerator.

6. The method of claim 1, further comprising:

performing a second operation on a particular cache line that is monitored by a monitor logic associated with the accelerator;

detecting, by the monitor logic associated with the accelerator, that a core of the processor has performed the second operation on the particular cache line; and notifying the accelerator by the monitor logic that the input data on the particular cache line is ready to be operated on by the accelerator responsive to the detecting.

7. The method of claim 6, wherein the second operation comprises a read invalidate own operation, the method further comprising:

waking the accelerator by the monitor logic responsive to detecting the read invalidate own operation on the particular cache line.

8. The method of claim 1, wherein determining that the output data of the accelerator is ready to be consumed comprises:

detecting, by a monitor logic of the processor, that the accelerator has performed a second operation on a particular cache line monitored by the monitor logic; and notifying, by the monitor logic of the processor, a core or a thread at user level of the processor that the output data is ready to be consumed responsive to the detecting.

9. The method of claim 8, wherein the second operation comprises a read invalidate own operation on the particular cache line by the accelerator.

10. The method of claim 1, wherein the accelerator is a programmable logic device coupled to the processor.

11. A computing device comprising:

a processor; and an accelerator, coupled to the processor, to accelerate one or more operations for the processor;

wherein the processor is to:

write input data to a first cache line of a cache shared by the processor and the accelerator, wherein the input data is ready to be operated on by the accelerator;

write instructions to one or more cache lines, the one or more cache lines designated as a queue for the accelerator, wherein the instructions indicate first operation to be performed by the accelerator and a virtual pointer to the input data in the cache;

determine that output data of the accelerator is ready to be consumed, the output data being located at the first cache line or at an additional cache line of the cache, wherein the first cache line or the additional cache line comprises a set first flag that indicates the first cache line or the additional cache line was modified by the accelerator and that prevents the output data from being removed from the first cache line or the additional cache line until the output data is read by the processor;

read and process the output data from the first cache line or the additional cache line; and responsive to the output data being processed:

remove the first flag from the first cache line or the additional cache line; and set a second flag in the first cache line or the additional cache line, wherein the second flag marks the first cache line or the additional cache line as being least recently used.

12. The computing device of claim 11, wherein the accelerator and the processor are both components of a single integrated circuit, and wherein the cache comprises a last level cache of the processor.

13. The computing device of claim 11, wherein the accelerator is to:

read the input data in the first cache line of the cache;

mark the input data in the first cache line as least recently used;

perform operations on the input data to generate the output data; and write the output data into the first cache line or the additional cache line.

14. The computing device of claim 11, wherein a core of the processor is further to perform a second operation on a particular cache line, and wherein one of the accelerator or the processor comprises a monitor logic to:

monitor the particular cache line;

detect that the core of the processor has performed the second operation on the particular cache line; and subsequently notify the accelerator that the input data on the particular cache line is ready to be operated on.

15. The computing device of claim 14, wherein the monitor logic is further to:

wake the accelerator responsive to detecting that the core of the processor has performed the second operation on the particular cache line.

16. The computing device of claim 11, wherein the processor comprises a core and a monitor logic coupled to the core, the monitor logic to:

detect that the accelerator has performed second operation on a particular cache line monitored by the monitor logic; and subsequently notify the core or a user level thread of the processor that the output data is ready to be consumed.

17. The computing device of claim 11, wherein the accelerator is a programmable logic device coupled to the processor.

18. A processor comprising:

a cache;

a core, coupled to the cache, the core to:

write input data to a first cache line of the cache, wherein the input data is ready to be operated on by an accelerator, and wherein the cache is shared by the core and the accelerator;

write instructions to one or more cache lines, the one or more cache lines designated as a queue for the accelerator, wherein the instructions indicate a first operation to be performed by the accelerator and a virtual pointer to the input data in the cache;

determine that output data of the accelerator is ready to be consumed, the output data being located at the first cache line or at an additional cache line of the cache, wherein the first cache line or the additional cache line comprises a set first flag that indicates the first cache line or the additional cache line was modified by the accelerator and that prevents the output data from being removed from the first cache line or the additional cache line until the output data is read by the processor;

read and process the output data from the first cache line or the additional cache line; and responsive to the output data being processed:
remove the first flag from the first cache line or the additional cache line; and set a second flag in the first cache line or the additional cache line, wherein the second flag marks the first cache line or the additional cache line as being least recently used.

19. The processor of claim 18, further comprising:
a monitor logic to:
detect that the accelerator has performed a second operation on a particular cache line monitored by the monitor logic; and notify the core or a user level thread of the processor that the output data is ready to be consumed.

20. The processor of claim 18, wherein the accelerator is a programmable logic device coupled to the processor.

* * * * *